(12) United States Patent
Nezu et al.

(10) Patent No.: US 9,512,361 B2
(45) Date of Patent: Dec. 6, 2016

(54) HIGH-VOLTAGE COIL

(71) Applicant: Sumitomo Chemical Company, Limited, Chuo-ku, Tokyo (JP)

(72) Inventors: Hideaki Nezu, Tsukuba (JP); Mitsuo Maeda, Tsukuba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 1077 days.

(21) Appl. No.: 13/661,484

(22) Filed: Oct. 26, 2012

(65) Prior Publication Data
US 2013/0106549 A1    May 2, 2013

(30) Foreign Application Priority Data
Oct. 31, 2011 (JP) ................. 2011-238982

(51) Int. Cl.
| | |
|---|---|
| H01F 27/30 | (2006.01) |
| C08G 59/50 | (2006.01) |
| C08F 283/00 | (2006.01) |
| C09K 19/38 | (2006.01) |
| H01F 5/06 | (2006.01) |
| H01F 27/32 | (2006.01) |

(Continued)

(52) U.S. Cl.
CPC .......... *C09K 19/3809* (2013.01); *H01F 5/06* (2013.01); *H01F 27/327* (2013.01); *C08K 7/14* (2013.01); *H01H 50/546* (2013.01)

(58) Field of Classification Search
CPC ........ H01F 27/327; C08L 67/00; C08L 67/02; C08L 2666/18; C08L 77/12; C09K 19/3809

USPC ... 336/198, 200; 252/299.62, 299.5, 299.67; 528/190, 180; 523/204, 400, 451, 457, 523/466; 525/480, 523, 534
See application file for complete search history.

(56) References Cited

U.S. PATENT DOCUMENTS

| | | | | |
|---|---|---|---|---|
| 3,483,150 A | * | 12/1969 | Ehrlich | .......... C08G 18/10 524/751 |
| 4,131,714 A | * | 12/1978 | Karkoski | .......... C09J 167/02 174/110 PM |

(Continued)

FOREIGN PATENT DOCUMENTS

| | | |
|---|---|---|
| CN | 102177557 A | 9/2011 |
| JP | H02232909 A | 9/1990 |

(Continued)

OTHER PUBLICATIONS

Office Action issued Dec. 3, 2015 in CN Application No. 201210419404.5.

(Continued)

*Primary Examiner* — Alexander Talpalatski
*Assistant Examiner* — Joselito Baisa
(74) *Attorney, Agent, or Firm* — Panitch Schwarze Belisario & Nadel LLP

(57) ABSTRACT

The present invention provides a high-voltage coil superior in insulating properties and rigidity at high temperatures, which comprises a bobbin, a conducting wire wound around the bobbin, and an encapsulant encapsulating the conducting wire, wherein the encapsulant comprises a liquid crystalline polyester having a repeating unit represented by defined formula (1), —O—Ar$^1$—CO—, a repeating unit represented by defined formula (2), —CO—Ar$^2$—CO—, and a repeating unit represented by defined formula (3), —X—Ar$^3$—Y—, as a forming material.

7 Claims, 1 Drawing Sheet

(51) Int. Cl.
*C08K 7/14* (2006.01)
*H01H 50/54* (2006.01)

(56) References Cited

U.S. PATENT DOCUMENTS

| | | | | |
|---|---|---|---|---|
| 5,427,712 A * | 6/1995 | Nakamura | ............... | C08K 7/08 252/299.01 |
| 5,847,039 A * | 12/1998 | Nagashima | ............. | C08K 3/22 524/430 |
| 6,153,121 A * | 11/2000 | Makabe | ................... | C08K 7/08 252/299.01 |
| 6,294,618 B1 * | 9/2001 | Soelch | ................. | C08G 63/914 525/434 |
| 6,580,363 B1 * | 6/2003 | Wilson | ................. | H01Q 1/2241 340/442 |
| 7,014,921 B2 * | 3/2006 | Okamoto | ............. | C08G 63/605 428/458 |
| 7,331,367 B2 * | 2/2008 | Koch | ................. | B60C 23/0493 152/152.1 |
| 7,510,618 B2 * | 3/2009 | Koch | ................. | B29C 33/0016 152/152.1 |
| 2002/0155146 A1 * | 10/2002 | Mathiowitz | ............. | B29C 55/00 424/426 |
| 2004/0087740 A1 * | 5/2004 | Ogura | ................. | C08G 59/066 525/523 |
| 2008/0246181 A1 * | 10/2008 | Zhu | ........................ | B82Y 30/00 264/239 |
| 2008/0268179 A1 * | 10/2008 | Kawaguchi | ........ | C09K 19/3809 428/1.1 |
| 2009/0017195 A1 * | 1/2009 | Vallance | ............... | C08F 283/08 427/96.2 |
| 2011/0073807 A1 | 3/2011 | Kohinata et al. | | |

FOREIGN PATENT DOCUMENTS

| | | |
|---|---|---|
| JP | 2002-015928 A | 1/2002 |
| JP | 2007154169 A | 6/2007 |
| JP | 2008198445 A | 8/2008 |
| JP | 2008237005 A | 10/2008 |
| JP | 2011140638 A | 7/2011 |

OTHER PUBLICATIONS

Office Action issued Sep. 1, 2015 in JP Application No. 2011238982.

* cited by examiner

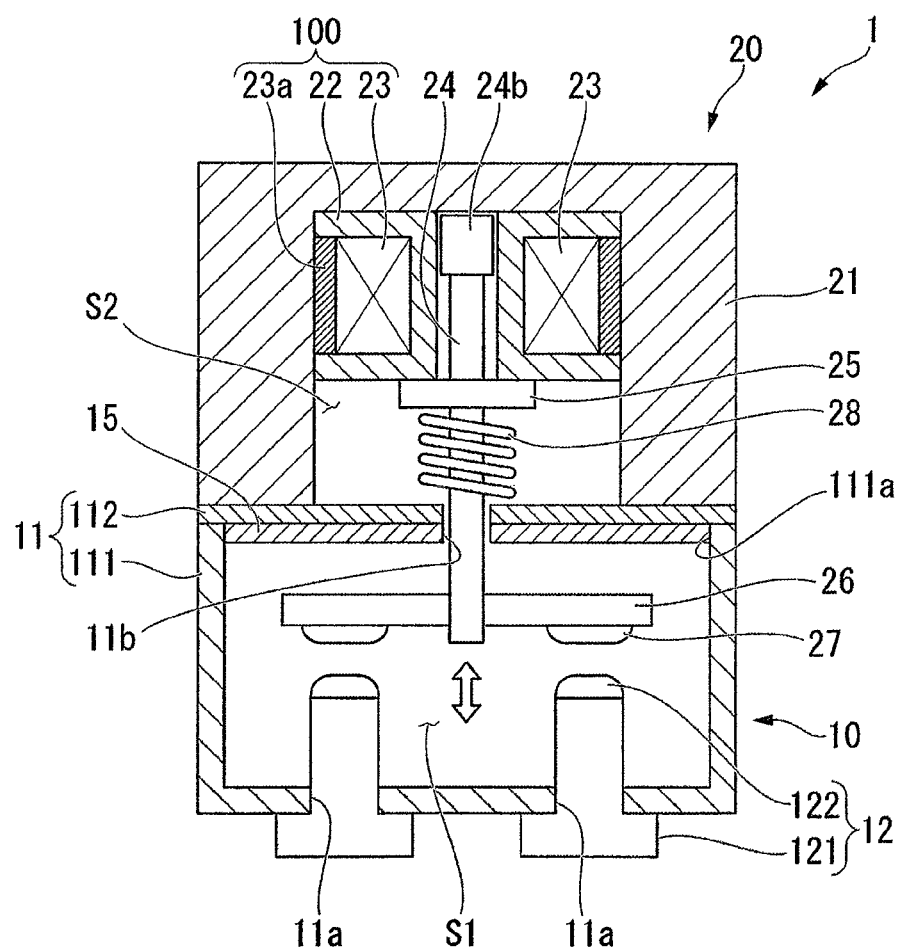

HIGH-VOLTAGE COIL

BACKGROUND OF THE INVENTION

Field of the Invention

The present invention relates to a high-voltage coil.

Description of the Related Art

High-voltage coils to be used for power relays and switching transformers (e.g., power transformers and DC-DC converters) for electric power control and parts such as coils (e.g., coils for plug ignition) are generally used in a situation where a voltage of not lower than 100 V is applied, and an item in which a magnet wire is wound around a resin component produced by a molding method such as injection molding is used as a high-voltage coil.

When such a high-voltage coil is used for an electric system mounted around the engine of a hybrid automobile, the above-mentioned resin component is required to have a withstand voltage high enough for reducing the thickness from the viewpoint of weight reduction of automobiles and reduction in the amount of resin to be used. The resin component is also required to have a withstand voltage at temperatures not lower than 100° C. in view of the use thereof in a high temperature environment such as an engine room or the generation of heat under the application of electric current.

Heretofore, mixed compositions of a polyphenylene oxide and a polystyrene have widely been used as forming materials of high-voltage coils. Recently, the use of such materials as liquid crystalline polyesters also has been studied (see, for example, JP-A-2002-15928).

Such a high-voltage coil reaches a high temperature due to heating by the use environment or the application of electric current. Therefore, warpage or deformation may be caused if the high-voltage coil is low in rigidity in a high temperature environment. Since high voltage is applied to high-voltage coils, the reliability of a high-voltage coil may deteriorate due to the occurrence of an electrical breakdown if the coil is low in withstand voltage in a high temperature environment.

However, the above-cited patent document fails to fully disclose consideration regarding such expected problems and much room was left for studies about high-voltage coils using a liquid crystalline polyester as a forming material.

SUMMARY OF THE INVENTION

The present invention was devised in view of such situations and the object thereof is to provide a high-voltage coil superior in insulating properties and rigidity at high temperatures.

In order to solve the above-described problem, the present invention is a high-voltage coil comprising a bobbin, a conducting wire wound around a winding part of the bobbin, and an encapsulant encapsulating the conducting wire, wherein the encapsulant comprises a liquid crystalline polyester having a repeating unit represented by the following formula (1), a repeating unit represented by the following formula (2), and a repeating unit represented by the following formula (3) as a forming material, and the content of repeating units having a m-phenylene group in the liquid crystalline polyester is 0 mol % to 6.5 mol % based on the total amount of all repeating units:

—O—Ar$^1$—CO— (1)

—CO—Ar$^2$—CO— (2)

—X—Ar$^3$—Y— (3)

—Ar$^4$—Z—Ar$^5$— (4)

wherein Ar$^1$ represents a phenylene group, a naphthylene group, or a biphenylylene group; Ar$^2$ and Ar$^3$ each independently represent a phenylene group, a naphthylene group, a biphenylylene group, or a group represented by formula (4) provided above; X and Y each independently represent an oxygen atom or an imino group (—NH—); the hydrogen atoms existing in the groups represented by Ar$^1$, Ar$^2$, or Ar$^3$ may each independently have been substituted with a halogen atom, an alkyl group having 1 to 10 carbon atoms, or an aryl group having 6 to 20 carbon atoms; Ar$^4$ and Ar$^5$ each independently represent a phenylene group or a naphthylene group; and Z represents an oxygen atom, a sulfur atom, a carbonyl group, a sulfonyl group, or an alkylidene group.

In the present invention, it is desirable that Ar$^1$ be a p-phenylene group or a 2,6-naphthylene, Ar$^2$ be a p-phenylene group, a m-phenylene group, or a 2,6-naphthylene group, Ar$^3$ be a p-phenylene group or a 4,4'-biphenylylene group, and X and Y be oxygen atoms.

In the present invention, it is desirable that the liquid crystalline polyester have 30 mol % to 80 mol % of the repeating units represented by formula (1), 10 mol % to 35 mol % of the repeating units represented by formula (2), and 10 mol % to 35 mol % of the repeating units represented by formula (3) based on the total amount of all repeating units.

In the present invention, it is desirable that the forming material be a composition comprising the liquid crystalline polyester and a glass fiber.

In the present invention, it is desirable that the content of the glass fiber be 10 parts by mass to 100 parts by mass based on 100 parts by mass of the liquid crystalline polyester.

In the present invention, it is desirable that the bobbin contain the liquid crystalline polyester as a forming material.

In the present invention, it is desirable that the bobbin be formed using the same forming material as that of the encapsulant.

According to the present invention, a high-voltage coil can be provided which is superior in insulating properties and rigidity at high temperatures.

BRIEF DESCRIPTION OF THE DRAWINGS

FIG. 1 is a schematic sectional view illustrating a relay having a high-voltage coil of the present embodiment.

DETAILED DESCRIPTION OF THE PREFERRED EMBODIMENTS

High-voltage coils of the present embodiment can be used, for example, as a power relay (a relay) for power control, a power transformer, and a switching transformer of a DC-DC converter and the like.

A relay is a device that switches conducting or nonconducting of a circuit by contacting or noncontacting of an electrode (contact point) in a circuit where a high voltage direct current will flow through. In such a relay, there is constituted a linear solenoid in which one (a movable electrode) of a pair of electrodes arranged in a switchable way is moved by applying a voltage to a high-voltage coil in the device.

A power transformer generates a periodically changeable magnetic field by an alternating current applied to an input winding (primary winding) and then transmits the magnetic field to an output winding (secondary winding) connected with a mutual inductance, thereby generating an electric current in the secondary winding. At this time, by varying the number of winding of each of the windings, the current is converted into a higher voltage (boosted voltage) or a lower voltage (stepped-down voltage) than the alternating current to be input. In such a power transformer, a high-voltage coil is used as a coil around which each winding is wound.

A switching transformer is a device that is used for a switching power source and converts a direct power to be inputted into a different direct power having a changed voltage like the above-mentioned power transformer. Also in such a switching transformer, a high-voltage coil is used as a coil in which each wire is wound.

In the following, a relay having a high-voltage coil of the present embodiment, especially, a high-voltage coil of the present embodiment is described with reference to a drawing. FIG. 1 is a schematic sectional view of a relay having a high-voltage coil of the present embodiment. The relay 1 of the present embodiment is a so-called plunger type relay having a contact point encapsulating section 10 and a driving section 20.

The contact point encapsulating section 10 has a housing 11 and a fixed electrode 12 inserted in the housing 11. The housing 11 has a body 111 having an opening 111a, being formed using an insulating material, and having a space (interior space S1) in which an electrode is accommodated, and a metal lid 112 disposed so as to close the opening 111a of the body 111.

The body 111 is formed using, for example, an insulating material lower in gas permeability than resin materials, such as ceramics, and the interior space S surrounded by the body 111 and the metal lid 112 is a space with high airtightness. In the interior space S1, a gas comprising, for example, hydrogen, helium, argon, nitrogen, and sulfur hexafluoride ($SF_6$) as principal ingredients has been enclosed under pressure and has been sealed hermetically.

In the housing 11, two perforated holes 11a are formed in the wall facing the lid 112 of the body 111. A fixed electrode 12 is inserted in and jointed to each of the perforated holes 11a. The fixed electrode 12 has a terminal 121 connecting the interior to the exterior of the housing 11, and a contact point 122 provided at the end of the terminal 121 located inside the housing.

An arc shield 15 has been provided so as to cover the lid 112 entirely on its surface facing the interior space S1. The arc shield 15 is a plate-shaped member of 1 mm to 2 mm in thickness provided on the surface of the lid 112 and has insulated the surface of the lid 112. The arc shield 15 may be formed as a member integrated with the lid 112 or alternatively may be formed as a member separate from the lid 112.

The driving section 20 has a body 21 containing an interior space S2, a bobbin 22 made from a nonmagnetic material accommodated in the interior space S2, a conducting wire 23 formed while being wound on the exterior of the bobbin 22, a shaft 24 having been inserted partly into the interior of the bobbin 22, a fixed iron core 25 made of iron which is provided on one end of the bobbin 22 and through which the shaft 24 penetrates, a movable electrode 26 provided at one end 24a of the shaft 24, a contact point 27 provided on the movable electrode 26, and a spring 28 provided between the fixed iron core 25 and the lid 112.

The conducting wire 23 has been encapsulated with an encapsulant 23a that is an insulating resin material. The bobbin 22, the conducting wire 23, and the encapsulant 23a correspond to the high-voltage coil 100 of the present invention. The encapsulant 23a is described in detail later.

The lid 112 and the arc shield 15 of the contact point encapsulating section 10 are provided with a continuing perforated hole 11b and the shaft 24 has penetrated through the perforated hole 11b. The other end 24a of the shaft 24 is located in the interior space S1 the contact point encapsulating section 10 and a movable electrode 26 is arranged in the interior space S1. A contact point 27 of the movable electrode 26 is provided to face a contact point 122 of the fixed electrode 12.

On the other end of the shaft 24 has been provided a core 24b formed from a magnetic substance, and the conducting wire 23 and the shaft 24 having a core 24b form a linear solenoid.

In the relay 1 with such configuration, the application of a high voltage current to the high-voltage coil 100 (conducting wire 23) produce a magnetic field, which excites the core 24b. Then, the excited core 24b is attracted by a fixed iron core 25 made of iron, so that the whole shaft 24 moves from the interior of the bobbin 22 to the exterior of the bobbin 22. Therefore, at one end 24a of the shaft 24, a contact point 27 of the movable electrode 26 and a contact point 122 of the fixed electrode 12 are connected to each other. At this time, spring 28 is compressed.

On the other hand, when the application of an electric current to the conducting wire 23 is stopped, the spring 28 is recovered elastically, so that the contact point of the movable electrode 26 is separated from the contact point 122 of the fixed electrode 12.

In the relay 1, the contact point is opened and closed as described above.

(Liquid Crystalline Polyester)

The encapsulant that constitutes the high-voltage coil 100 of the present embodiment is a liquid crystalline polyester that exhibits liquid crystallinity in its molten state and it preferably is one that melts at temperatures not higher than 450° C. The liquid crystalline polyesters may be a liquid crystalline polyesteramide, a liquid crystalline polyesterether, a liquid crystalline polyestercarbonate, or a liquid crystalline polyesterimide. The liquid crystalline polyester is preferably an all-aromatic, liquid crystalline polyester prepared using only an aromatic compound as a feed monomer.

In the present embodiment, a liquid crystalline polyester having a repeating unit represented by the following formula (1) (hereinafter sometimes described as "repeating unit (1)"), a repeating unit represented by the following formula (2) (hereinafter sometimes described as "repeating unit (2)"), and a repeating unit represented by the following formula (3) (hereinafter sometimes described as "repeating unit (3)"), the content of repeating units having a m-phenylene group in the liquid crystalline polyester being 0 mol % to 6.5 mol % based on the total amount of all repeating units, is used as a liquid crystalline polyester,

   (1)

   (2)

   (3)

   (4)

wherein $Ar^1$ represents a phenylene group, a naphthylene group, or a biphenylylene group; $Ar^2$ and $Ar^3$ each independently represent a phenylene group, a naphthylene group, a biphenylylene group, or a group represented by formula (4) provided above; X and Y each independently represent an oxygen atom or an imino group (—NH—); the hydrogen atoms existing in the groups represented by $Ar^1$, $Ar^2$, or $Ar^3$ may each independently have been substituted with a halogen atom, an alkyl group having 1 to 10 carbon atoms, or an aryl group having 6 to 20 carbon atoms; $Ar^4$ and $Ar^5$ each independently represent a phenylene group or a naphthylene group; and Z represents an oxygen atom, a sulfur atom, a carbonyl group, a sulfonyl group, or an alkylidene group.

The "total amount of all repeating units" as referred to herein is the sum total of the amounts (mol) equivalent to the amounts of substance of respective repeating units constituting a liquid crystalline polyester each calculated by dividing the mass of a repeating unit by the formula weight of the repeating unit.

Due to such configuration, the skeleton of the liquid crystalline polyester constituting an encapsulant becomes rigid, affording a high-voltage coil that is superior in rigidity at high temperatures and hardly produces deformation such as warpage. Moreover, a liquid crystalline polyester having such a skeleton, which is likely to have a high density through the crystallization of a mesogen part thereof, can afford a high-voltage coil that is superior in insulating properties at high temperatures and hardly causes dielectric breakdown even if the distance between adjoining terminals is short.

Examples of the halogen atom include a fluorine atom, a chlorine atom, a bromine atom, and an iodine atom.

Examples of the alkyl group include a methyl group, an ethyl group, a n-propyl group, an isopropyl group, a n-butyl group, an isobutyl group, a sec-butyl group, a tert-butyl group, a n-hexyl group, a 2-ethylhexyl group, a n-octyl group, and a n-decyl group, and the number of the carbon atom(s) thereof is usually 1 to 10.

Examples of the aryl group include a phenyl group, an o-tolyl group, a m-tolyl group, a p-tolyl group, a 1-naphthyl group, and a 2-naphthyl group, and the number of the carbon atom(s) thereof is usually 6 to 20.

In the case that a hydrogen atom of the groups represented by $Ar^1$, $Ar^2$, or $Ar^3$ has been substituted with such a group, the number of substitution is usually up to 2, preferably up to 1 independently for the groups represented by $Ar^1$, $Ar^2$, or $Ar^3$.

Examples of the alkylidene group include a methylene group, an ethylidene group, an isopropylidene group, a n-butylidene group, and a 2-ethylhexylidene group; the number of carbon atoms thereof is usually 1 to 10.

When the liquid crystalline polyester has a repeating unit containing a m-phenylene group, the m-phenylene group may be contained in any of a repeating unit (1) through a repeating unit (3). The content of the repeating units having a m-phenylene group is preferably up to 6 mol %, more preferably up to 4 mol %, and even more preferably up to 3 mol % based on the total amount of all repeating units. In addition, the smaller the content of the repeating units having a m-phenylene group, the more likely the insulating properties of an encapsulant is to be improved, but if the content is excessively small, it becomes difficult to mold the liquid crystalline polyester. Therefore, the content of the repeating units having a m-phenylene group is preferably not less than 1 mol % based on the total amount of all repeating units.

The repeating unit (1) is a repeating unit derived from a prescribed aromatic hydroxycarboxylic acid. As the repeating unit (1), one in which $Ar^1$ is a p-phenylene group (a repeating unit derived from p-hydroxybenzoic acid) and one in which $Ar^1$ is a 2,6-naphthylene group (a repeating unit derived from 6-hydroxy-2-naphthoic acid) are preferred.

The repeating unit (2) is a repeating unit derived from a prescribed aromatic dicarboxylic acid. Preferred as the repeating unit (2) are one wherein $Ar^2$ is a p-phenylene group (a repeating unit derived from terephthalic acid), one wherein $Ar^2$ is a m-phenylene group (a repeating unit derived from isophthalic acid), and one wherein $Ar^2$ is a 2,6-naphthylene group (a repeating unit derived from 2,6-naphthalenedicarboxylic acid).

The repeating unit (3) is a repeating unit derived from a prescribed aromatic diol, aromatic hydroxylamine, or aromatic diamine. As the repeating unit (3), one in which $Ar^3$ is a p-phenylene group (a repeating unit derived from hydroquinone, p-aminophenol, or p-phenylenediamine), and one in which $Ar^3$ is a 4,4'-biphenylylene group (a repeating unit derived from 4,4'-dihydroxybiphenyl, 4-amino-4'-hydroxybiphenyl, or 4,4'-diaminobiphenyl) are preferred.

The content of the repeating unit (1) is not less than 30 mol %, preferably 30 mol % to 80 mol %, more preferably 40 mol % to 70 mol %, and even more preferably 45 mol % to 65 mol % based on the total amount of all repeating units.

The content of the repeating unit (2) is not more than 35 mol %, preferably 10 mol % to 35 mol %, more preferably 15 mol % to 30 mol %, and even more preferably 17.5 mol % to 27.5 mol % based on the total amount of all repeating units.

The content of the repeating unit (3) is not more than 35 mol %, preferably 10 mol % to 35 mol %, more preferably 15 mol % to 30 mol %, and even more preferably 17.5 mol % to 27.5 mol % based on the total amount of all repeating units.

The larger the content of the repeating unit (1), the more likely the melt flowability, the heat resistance, and the strength/rigidity are improved; however, if it is excessively large, the melting temperature and the melt viscosity easily become high and temperature necessary for shaping easily becomes high.

The ratio of the content of the repeating unit (2) to the content of the repeating unit (3), expressed by [the content of the repeating unit (2)]/[the content of the repeating unit (3)] (mol/mol), is usually from 0.9/1 to 1/0.9, preferably from 0.95/1 to 1/0.95, and more preferably from 0.98/1 to 1/0.98.

As to each of the repeating units (1) to (3), the liquid crystalline polyester may have two or more types of repeating units. Although the liquid crystalline polyester may have repeating units other than the repeating units (1) to (3), the content of such repeating units other than the repeating units (1) to (3) is not more than 10 mol %, preferably not more than 5 mol % based on the total amount of all repeating units.

Such liquid crystalline polyesters can be produced by polymerizing (polycondensing) a monomer to afford the repeating unit (1) (an aromatic hydroxycarboxylic acid), a monomer to afford the repeating unit (2) (an aromatic dicarboxylic acid), and a monomer to afford the repeating unit (3) (an aromatic diol, an aromatic hydroxylamine, or an aromatic diamine). In that case, the amount of the monomer having a m-phenylene group is adjusted to become 0 mol % to 6.5 mol % based on the total amount of all monomers.

Here, the aromatic hydroxycarboxylic acid, the aromatic dicarboxylic acid, the aromatic diol, the aromatic hydroxyamine, and the aromatic diamine each independently allow their polymerizable derivatives to be used as a substitute for a part or the whole thereof.

Examples of polymerizable derivatives of compounds having a carboxyl group such as an aromatic hydroxycarboxylic acid and an aromatic dicarboxylic acid include compounds (esters) resulting from the conversion of a carboxyl group into an alkoxycarbonyl group or an aryloxycarbonyl group, compounds (acid halides) resulting from the conversion of a carboxyl group into a haloformyl group, and compounds (acid anhydrides) resulting from the conversion of a carboxyl group into an acyloxycarbonyl group.

Examples of polymerizable derivatives of compounds having a hydroxyl group such as an aromatic hydroxycarboxylic acid, an aromatic diol, and an aromatic hydroxyamine include compounds (acylated bodies) resulting from the conversion of a hydroxyl group into an acyloxyl group by acylation.

Examples of polymerizable derivatives of compounds having an amino group such as an aromatic hydroxyamine and an aromatic diamine include compounds (acylated bodies) resulting from the conversion of an amino group into an acylamino group by acylation.

Preferably, the liquid crystalline polyester is produced by causing monomers to undergo melt polymerization and then causing the resulting polymer (prepolymer) to undergo solid phase polymerization. A high molecular weight liquid crystalline polyester that is high in heat resistance or melt tension can thereby be produced with sufficient operativity. The melt polymerization may be carried out in the presence of a catalyst; examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as N,N-dimethylaminopyridine and N-methylimidazole; nitrogen-containing heterocyclic compounds are used preferably.

The flow onset temperature of a liquid crystalline polyester is preferably not lower than 280° C., more preferably not lower than 290° C., and even more preferably not lower than 295° C. and it is usually not higher than 380° C., preferably not higher than 350° C. The higher the flow onset temperature is, the more easily the heat resistance or the melt tension is improved; if the flow onset temperature is excessively high, a high temperature is required to melt a liquid crystalline polyester and thermal degradation easily occurs in molding.

The flow onset temperature, which is also called flow temperature and serves as a measure of the molecular weight of a liquid crystalline polyester, is a temperature at which a melt viscosity of 4800 Pa·s (48,000 poise) is exhibited when a melt of a liquid crystalline polyester heated at a temperature increase rate of 4° C./min is extruded through a nozzle under a load of 9.8 MPa (100 kg/cm$^2$) using a capillary rheometer having a nozzle 1 mm in inner diameter and 10 mm in length (see "Liquid Crystalline Polymer—Synthesis, Molding, and Application—" edited by Naoyuki Koide, p. 95, CMC Publishing Co., Ltd, published on Jun. 5, 1987).

The forming material of the encapsulant of this embodiment may be used in the form of a liquid crystalline polyester composition after blending one or more additional components such as a filler, an additive, and a resin other than liquid crystalline polyesters with the liquid crystalline polyester described above.

The filler may be a fibrous filler or a platy filler or a spherical or other granular filler other than fibrous or platy filler. The filler may be either an inorganic filler or an organic filler.

Examples of the fibrous inorganic filler include glass fiber; and ceramic fibers, such as silica fiber, alumina fiber, and silica alumina fiber. Further examples include whiskers such as potassium titanate whisker, barium titanate whisker, wollastonite whisker, aluminum borate whisker, silicon nitride whisker, and silicon carbide whisker.

Examples of the fibrous organic filler include polyester fibers and aramid fibers.

Examples of the platy inorganic filler include talc, mica, graphite, wollastonite, glass flakes, barium sulfate, and calcium carbonate. The mica may be muscovite or phlogopite or fluorine phlogopite or tetrasilicon mica.

Examples of the granular inorganic filler include silica, alumina, titanium oxide, glass beads, glass balloons, boron nitride, silicon carbide, and calcium carbonate.

The loading of such a filler is preferably 0 parts by mass to 100 parts by mass based on of 100 parts by mass of the liquid crystalline polyester.

Particularly, it is preferable to charge a glass fiber into an encapsulant by incorporating the glass fiber into a liquid crystalline polyester because the strength of the encapsulant and the strength of a high-voltage coil will be improved thereby easily.

The amount of the glass fiber is preferably 10 parts by mass to 100 parts by mass, more preferably 30 parts by mass to 100 parts by mass, and even more preferably 30 parts by mass to 80 parts by mass based on 100 parts by mass of the liquid crystalline polyester. If the amount of the glass fiber is excessively small, the effect to improve strength is insufficient whereas if the amount is excessively large, anisotropy is exhibited easily.

The glass fiber preferably has a number average diameter of up to 25 μAm, more preferably up to 20 μm and a number average length of up to 500 μm, more preferably up to 300 μm. The number average diameter and the number average length of a glass fiber can be measured by observing the glass fiber by an electron microscope.

Examples of the additive include antioxidants, heat stabilizers, UV absorbers, antistatic agents, surfactants, flame retardants, and coloring agents. The loading of such an additive is preferably 0 parts by mass to 5 parts by mass based on 100 parts by mass of the liquid crystalline polyester.

Examples of the resins other than liquid crystalline polyesters include thermoplastic resins other than, liquid crystalline polyesters, such as polypropylenes, polyamides, polyesters other than liquid crystalline polyesters, polysulfones, polyphenylene sulfides, polyether ketones, polycarbonates, polyphenylene ethers and polyether imides; and thermosetting resins, such as phenol resins, epoxy resins, polyimide resins, and cyanate resins. The loading of such a resin other than liquid crystalline polyesters is preferably 0 parts by mass to 20 parts by mass relative to 100 parts by mass of the liquid crystalline polyester.

The liquid crystalline polyester composition can be prepared by melt-kneading a liquid crystalline polyester and other components to be used according to need by using an extruder, and extruding them into a pellet form. An extruder having a cylinder, one or more screws installed within the cylinder, and one or more feed ports provided on the cylinder is used preferably as the above-mentioned extruder and one further having one or more vents are provided on the cylinder is used more preferably.

The molding of the high-voltage coil is performed preferably by a melt molding process, more preferably by an injection molding process. Specifically, an item prepared by winding a conducting wire on an injection molded bobbin is mounted in a mold of an injection molding machine again and then the above-described liquid crystalline polyester or liquid crystalline polyester composition is injection molded to encapsulate the conducting wire with an encapsulant.

Thus, a high-voltage coil is fabricated. Therefore, the bobbin is required to have heat resistance such that the bobbin does not deform at the processing temperature of the encapsulant.

At this time, the use of the above-described liquid crystalline polyester or liquid crystalline polyester composition as the forming material of the bobbin is preferred because high heat resistance and high insulating properties can be imparted also to the bobbin. Moreover, the use of a common material for both the forming material of the bobbin and the forming material of the encapsulant is more preferred because a highly reliable high-voltage coil can be formed in which separation hardly occurs at the interface between the bobbin and the encapsulant.

The high-voltage coil having the above-described configuration is superior in insulating properties and rigidity at high temperatures.

Examples of a preferred embodiment of the present invention have been illustrated with reference to the attached drawing, but it is needless to say that the present invention is not limited to these examples. The shape, the combination, and so on of the constituent components illustrated in the above-described examples are illustrative examples and may be modified according to design requirements unless such modification departs from the spirit of the invention.

EXAMPLES

The present invention is described more with reference to examples, but the invention is not limited the these examples.

In the examples, liquid crystalline polyesters were polymerized by using isophthalic acid as a monomer that affords a repeating unit containing a m-phenylene group and varying the proportion of isophthalic acid used. In addition, a plate-like specimen using such a liquid crystalline polyester was molded as a model sample of the encapsulant of a high-voltage coil, and then the heat resistance and the electrical endurance of the specimen were measured. Thereby, the heat resistance and the electrical endurance of a molded article using each liquid crystalline polyester were checked.

[Flow Onset Temperature]

The flow onset temperature of a liquid crystalline polyester was measured by using a flow tester ("CFT-500" manufactured by Shimadzu Corporation). About 2 g of a liquid crystalline polyester was filled into the cylinder of the flow tester to which a die with a nozzle having an inner diameter of 1 mm and a length of 10 mm had been attached, and then the liquid crystalline polyester was molten at a temperature increase rate of 4° C./min under a load of 9.8 MPa (100 kg/cm$^2$). Melt viscosity was measured while the molten liquid crystalline polyester was extruded through the nozzle, and the temperature at which a viscosity of 4800 Pa·s (48000 poise) was exhibited was determined to be a flow onset temperature.

Synthesis Example 1

Liquid Crystalline Polyester (1)

A reactor vessel equipped with a stirrer, a torque meter, a nitrogen gas inlet, a thermometer, and a reflux condenser was charged with 828.8 g (6.0 mol) of p-hydroxybenzoic acid, 473.4 g (2.85 mol) of terephthalic acid, 24.9 g (0.15 mol) of isophthalic acid, 558.6 g (3.0 mol) of 4,4'-dihydroxybiphenyl, and 1347.6 g (13.2 mol) of acetic anhydride, and then the temperature was raised from room temperature to 150° C. over 15 minutes under stirring under a nitrogen gas flow, followed by refluxing at 150° C. for 3 hours.

Subsequently, the temperature was raised from 150° C. to 320° C. over 2 hours and 50 minutes while by-produced acetic acid and unreacted acetic anhydride were distilled off. When the increase of torque was found, the contents were taken out of the reactor and cooled to room temperature.

Subsequently, the resulting solid was pulverized with a pulverizer, heated from room temperature to 250° C. over one hour under a nitrogen gas atmosphere, and then the temperature was raised from 250° C. to 320° C. over 5 hours and kept at 320° C. for 3 hours, whereby solid phase polymerization was carried out. Then, the resultant was cooled, so that a powdery liquid crystalline polyester (1) was obtained.

This liquid crystalline polyester (1) has 50 mol % of repeating units derived from p-hydroxybenzoic acid, 23.75 mol % of repeating units derived from terephthalic acid, 1.25 mol % of repeating units derived from isophthalic acid (repeating units containing a m-phenylene group), and 25 mol % of repeating units derived from 4,4'-dihydroxybiphenyl, based on the total amount of all repeating units. The flow onset temperature was measured to be 380° C.

Synthesis Example 2

Liquid Crystalline Polyester (2)

A reactor vessel equipped with a stirrer, a torque meter, a nitrogen gas inlet, a thermometer, and a reflux condenser was charged with 994.5 g (7.2 mol) of p-hydroxybenzoic acid, 358.8 g (2.16 mol) of terephthalic acid, 39.9 g (0.24 mol) of isophthalic acid, 446.9 g (2.4 mol) of 4,4'-dihydroxybiphenyl, 1347.6 g (13.2 mol) of acetic anhydride, and 0.20 g of 1-methylimidazole, and then the temperature was raised from room temperature to 150° C. over 30 minutes under stirring under a nitrogen gas flow, followed by refluxing at 150° C. for 60 minutes.

Subsequently, 0.9 g of 1-methylimidazole was added, and then the temperature was raised to 320° C. over 2 hours and 50 minutes while by-produced acetic acid and unreacted acetic anhydride were distilled off. When the increase of torque was found, the contents were taken out of the reactor and cooled to room temperature.

Subsequently, the resulting solid was pulverized with a pulverizer, heated from room temperature to 250° C. over one hour under a nitrogen gas atmosphere, and then the temperature was raised from 250° C. to 305° C. over 5 hours and kept at 305° C. for 3 hours, whereby solid phase polymerization was carried out. Then, the resultant was cooled, so that a powdery liquid crystalline polyester (2) was obtained.

This liquid crystalline polyester (2) has 60 mol % of repeating units derived from p-hydroxybenzoic acid, 18 mol % of repeating units derived from terephthalic acid, 2 mol % of repeating units derived from isophthalic acid, and 20 mol % of repeating units derived from 4,4'-dihydroxybiphenyl, based on the total amount of all repeating units. The flow onset temperature was measured to be 357° C.

Synthesis Example 3

Liquid Crystalline Polyester (3)

A reactor vessel equipped with a stirrer, a torque meter, a nitrogen gas inlet, a thermometer, and a reflux condenser was charged with 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, 1347.6 g (13.2 mol) of acetic anhydride, and 0.18 g of 1-methylimidazole, and then the temperature was raised from room temperature to 150° C. over 30 minutes under stirring under a nitrogen gas flow, followed by refluxing at 150° C. for 30 minutes.

Subsequently, 2.4 g of 1-methylimidazole was added, and then the temperature was raised from 150° C. to 320° C. over 2 hours and 50 minutes while by-produced acetic acid and unreacted acetic anhydride were distilled off. When the increase of torque was found, the contents were taken out of the reactor and cooled to room temperature.

Subsequently, the resulting solid was pulverized with a pulverizer, heated from room temperature to 250° C. over one hour under a nitrogen gas atmosphere, and then the temperature was raised from 250° C. to 295° C. over 5 hours and kept at 295° C. for 3 hours, whereby solid phase polymerization was carried out. Then, the resultant was cooled, so that a powdery liquid crystalline polyester (3) was obtained.

This liquid crystalline polyester (3) has 60 mol % of repeating units derived from p-hydroxybenzoic acid, 15 mol % of repeating units derived from terephthalic acid, 5 mol % of repeating units derived from isophthalic acid, and 20 mol % of repeating units derived from 4,4'-dihydroxybiphenyl, based on the total amount of all repeating units. The flow onset temperature was measured to be 330° C.

Synthesis Example 4

Liquid Crystalline Polyester (4)

A reactor vessel equipped with a stirrer, a torque meter, a nitrogen gas inlet, a thermometer, and a reflux condenser was charged with 994.5 g (7.2 mol) of p-hydroxybenzoic acid, 239.2 g (1.44 mol) of terephthalic acid, 159.5 g (0.96 mol) of isophthalic acid, 446.9 g (2.4 mol) of 4,4'-dihydroxybiphenyl, 1347.6 g (13.2 mol) of acetic anhydride, and 0.18 g of 1-methylimidazole, and then the temperature was raised from room temperature to 150° C. over 30 minutes under stirring under a nitrogen gas flow, followed by refluxing at 150° C. for 30 minutes.

Subsequently, 2.4 g of 1-methylimidazole was added, and then the temperature was raised from 150° C. to 320° C. over 2 hours and 50 minutes while by-produced acetic acid and unreacted acetic anhydride were distilled off. When the increase of torque was found, the contents were taken out of the reactor and cooled to room temperature.

Subsequently, the resulting solid was pulverized with a pulverizer, heated from room temperature to 220° C. over one hour under a nitrogen gas atmosphere, and then the temperature was raised from 220° C. to 240° C. over 30 minutes and kept at 240° C. for 10 hours, whereby solid phase polymerization was carried out. Then, the resultant was cooled, so that a powdery liquid crystalline polyester (4) was obtained.

This liquid crystalline polyester (4) has 60 mol % of repeating units derived from p-hydroxybenzoic acid, 12 mol % of repeating units derived from terephthalic acid, 8 mol % of repeating units derived from isophthalic acid, and 20 mol % of repeating units derived from 4,4'-dihydroxybiphenyl, based on the total amount of all repeating units. The flow onset temperature was measured to be 290° C.

[Glass Fiber]

The following were used as glass fiber.

Glass fiber (1): "REV8" produced by Nippon Sheet Glass Co., Ltd. (number average fiber diameter: 13 μm, number mean fiber length: 70 μm)

Glass fiber (2): "EFH75-01" produced by Central Glass Co., Ltd. (number average fiber diameter: 11 μm, number mean fiber length: 75 μm)

Example 1

100 parts by mass of liquid crystalline polyester (1) and 67 parts by mass of glass fiber (1) were mixed together and then pelletized using a twin screw extruder ("PCM-30" of Ikegai Co., Ltd.) at a cylinder temperature of 390° C., so that a pellet-shaped liquid crystalline polyester composition was obtained. The resulting liquid crystalline polyester composition was injection molded, affording molded articles sized in 64 mm×64 mm×0.5, 1.0, or 1.6 mm in thickness. For the molded articles obtained, the dielectric breakdown voltage and the warpage of each molded article were measured by the following methods.

[Dielectric Breakdown Voltage]

About the resulting molded articles, dielectric breakdown voltages at room temperature, 100° C., and 200° C. were measured by a short-term breakdown testing method in accordance with JIS C2110. As to the electrodes used for the measurement, the upper electrode was a spherical electrode 20 mm in diameter and the lower electrode was a disc-like electrode 25 mm in diameter.

The dielectric breakdown voltage in this example is the minimum voltage (effective value) at which a molded article of an insulating material is broken when voltage is applied to the molded article in accordance with the method described above and it is expressed by a breakdown voltage to the unit thickness of the molded article (unit: kV/mm). The measurement result of this example was determined as an average (arithmetic average) of the values measured for five molded articles (n=5), respectively.

[Warpage of Molded Article]

The warpage of a molded article was determined by a method in which was used an obtained molded article 0.5 mm in thickness, which was heated at 250° C. for 5000 hours under a nitrogen atmosphere and when one of the four vertexes of the molded article was pressed by a finger, there was measured the height of lifting of a vertex diagonal from the pressed vertex measured from the plane on which the molded article was placed. For one molded article, four values obtained by performing the measurement for every vertex were averaged and the average was used as the value of the warpage of the molded article.

Since the measuring limit of warpage by the method described above is about 2 mm, the detection limit in the method described above was decided to be up to 3 mm while taking into consideration a measurement error of 1 mm at most.

Example 2

Molded articles were obtained in the same manner as Example 1 except for mixing 100 parts by mass of liquid crystalline polyester (2) with 67 parts by mass of glass fiber (2) and changing the cylinder temperature used in pelletization to 360° C. For the molded articles obtained, the dielectric breakdown voltages and the warpage of the molded articles were measured in the same manner as Example 1.

Example 3

Molded articles were obtained in the same manner as Example 1 except for mixing 100 parts by mass of liquid crystalline polyester (3) with 67 parts by mass of glass fiber (2) and changing the cylinder temperature used in pelletization to 340° C. For the molded articles obtained, the dielectric breakdown voltages and the warpage of the molded articles were measured in the same manner as Example 1.

Comparative Example 1

Molded articles were obtained in the same manner as Example 1 except for mixing 100 parts by mass of liquid crystalline polyester (4) with 67 parts by mass of glass fiber (2) and changing the cylinder temperature used in pelletization to 300° C. For the molded articles obtained, the dielectric breakdown voltages and the warpage of the molded articles were measured in the same manner as Example 1.

For Examples 1 to 3 and Comparative Example 1, the results of the measurement of dielectric breakdown voltage and warpage are shown in the following Table 1.

TABLE 1

|  |  | Example 1 | | | Example 2 | | | Example 3 | | | Comparative Example 1 | | |
|---|---|---|---|---|---|---|---|---|---|---|---|---|---|
| Liquid crystalline polyester (part by mass) | (1) | 100 | | | — | | | — | | | — | | |
|  | (2) | — | | | 100 | | | — | | | — | | |
|  | (3) | — | | | — | | | 100 | | | — | | |
|  | (4) | — | | | — | | | — | | | 100 | | |
| Glass fiber (part by mass) | (1) | 67 | | | — | | | — | | | — | | |
|  | (2) | — | | | 67 | | | 67 | | | 67 | | |
| Thickness of molded article | mm | 0.5 | 1 | 1.6 | 0.5 | 1 | 1.6 | 0.5 | 1 | 1.6 | 0.5 | 1 | 1.6 |
| Dielectric breakdown voltage (at room temperature) | kV/mm | 53.8 | 40.1 | 38.2 | 53.5 | 44.8 | 38.2 | 51.8 | 45.8 | 37.3 | 38.4 | 30.3 | 23.2 |
| Dielectric breakdown voltage (at 100° C.) | kV/mm | 49.7 | — | — | 48.5 | — | — | 45.7 | — | — | 40.4 | — | — |
| Dielectric breakdown voltage (at 200° C.) | kV/mm | 45.1 | — | — | 42.4 | — | — | 41 | — | — | 37.4 | — | — |
| Warpage | mm | <3 | — | — | <3 | — | — | 8 | — | — | 13 | — | — |

As a result of the measurements, the results of the measurement of the warpage of the molded articles 0.5 mm in thickness showed that the molded article of Comparative Example 1 was larger in warpage and therefore easier to deform under high temperature conditions than the molded articles of Examples 1 to 3. It was also shown that among Examples 1 to 3, Examples 1 and 2 exhibited warpages smaller than 3 mm and therefore were better in heat resistance than Example 3.

In addition, the results of the measurement dielectric breakdown voltage for the molded articles 0.5 mm in thickness showed that the molded article of Comparative Example 1 was lower in electrical endurance than the molded articles of Examples 1 to 3 at any temperature.

Moreover, the results of the measurement of dielectric breakdown voltage at room temperature were confirmed that withstand voltage lowered suddenly between Example 3 (the isophthalic acid content of the liquid crystalline polyester was 5 mol %) and Comparative Example 1 (that content was 8 mol %). It was shown that when Example 1 (that content was 1.25 mol %) is taken as a standard, if the content of isophthalic acid is not less than 6.5 mol %, a withstand voltage not lower than 90% of the withstand voltage of Example 1 can be maintained and a high withstand voltage can be realized.

The usefulness of the present invention was confirmed from these results.

What is claimed is:

1. A high-voltage coil comprising a bobbin, a conducting wire wound around a winding part of the bobbin, and an encapsulant encapsulating the conducting wire, wherein the encapsulant comprises a liquid crystalline polyester having a repeating unit represented by the following formula (1), a repeating unit represented by the following formula (2), and a repeating unit represented by the following formula (3) as a forming material, and the content of repeating units having a m-phenylene group in the liquid crystalline polyester is 1 mol % to 6.5 mol % based on the total amount of all repeating units:

  (1)

  (2)

  (3)

  (4)

wherein $Ar^1$ represents a phenylene group, a naphthylene group, or a biphenylylene group; $Ar^2$ and $Ar^3$ each independently represent a phenylene group, a naphthylene group, a biphenylylene group, or a group represented by formula (4) provided above; X and Y each independently represent an oxygen atom or an imino group (—NH—); the hydrogen atoms existing in the group represented $Ar^1$, $Ar^2$, or $Ar^3$ may each independently have been substituted with a halogen atom, an alkyl group having 1 to 10 carbon atoms, or an aryl group having 6 to 20 carbon atoms; $Ar^4$ and $Ar^5$ each independently represent a phenylene group or a naphthylene group; and Z represents an oxygen atom, a sulfur atom, a carbonyl group, a sulfonyl group, or an alkylidene group.

2. The high-voltage coil according to claim 1, wherein $Ar^1$ is a p-phenylene group or a 2,6-naphthylene, $Ar^2$ is a p-phenylene group, a m-phenylene group, or a 2,6-naphthylene group, $Ar^3$ is a p-phenylene group or a 4,4'-biphenylylene group, and X and Y are oxygen atoms.

3. The high-voltage coil according to claim 1, wherein the liquid crystalline polyester has 30 mol % to 80 mol % of the repeating units represented by formula (1), 10 mol % to 35 mol % of the repeating units represented by formula (2), and 10 mol % to 35 mol % of the repeating units represented by formula (3) based on the total amount of all repeating units.

4. The high-voltage coil according to claim 1, wherein the forming material is a composition comprising the liquid crystalline polyester and a glass fiber.

5. The high-voltage coil according to claim 4, wherein the content of the glass fiber is 10 parts by mass to 100 parts by mass based on 100 parts by mass of the liquid crystalline polyester.

6. The high-voltage coil according to claim 1, wherein the bobbin contains the liquid crystalline polyester as a forming material.

7. The high-voltage coil according to claim 6, wherein the bobbin is formed using the same forming material as that of the encapsulant.

* * * * *